(12) United States Patent
Mahoney

(10) Patent No.: US 6,361,265 B1
(45) Date of Patent: Mar. 26, 2002

(54) ARTICLE TRANSFER APPARATUS

(75) Inventor: Donald Simpson Mahoney, Huntingdale (AU)

(73) Assignee: HECFAB Equipment Pty. Ltd., Huntingdale (AU)

( * ) Notice: Subject to any disclaimer, the term of this patent is extended or adjusted under 35 U.S.C. 154(b) by 0 days.

(21) Appl. No.: 09/202,882

(22) PCT Filed: Jun. 24, 1997

(86) PCT No.: PCT/AU97/00399

§ 371 Date: Dec. 22, 1998

§ 102(e) Date: Dec. 22, 1998

(87) PCT Pub. No.: WO97/49624

PCT Pub. Date: Dec. 31, 1997

(30) Foreign Application Priority Data

Jun. 25, 1996 (AU) .............................. PO 0637

(51) Int. Cl.[7] .............................................. B65G 47/52
(52) U.S. Cl. ...................... 414/497; 414/495; 414/502; 414/787; 414/799; 414/789.9; 198/468.6
(58) Field of Search .............................. 414/799, 789.9, 414/788.9, 787, 495, 497, 502; 198/468.6

(56) References Cited

U.S. PATENT DOCUMENTS

| | | | | |
|---|---|---|---|---|
| 3,223,254 A | * | 12/1965 | Stewart | 414/497 |
| 3,517,834 A | * | 6/1970 | Adams | 414/788.9 |
| 3,757,939 A | * | 9/1973 | Henig | 209/72 |
| 3,820,667 A | * | 6/1974 | Critchlow | 414/497 |
| 3,984,010 A | | 10/1976 | Woloveke et al. | |
| 4,339,117 A | | 7/1982 | Tison | |
| 4,439,098 A | | 3/1984 | Rienks | |
| 4,907,337 A | * | 3/1990 | Krusi | 29/568 |
| 5,238,100 A | * | 8/1993 | Rose, Jr. et al. | 198/486.6 |
| 5,238,350 A | | 8/1993 | Krieg et al. | |
| 5,468,118 A | | 11/1995 | LePoire | |
| 5,613,435 A | * | 3/1997 | Kuckhermann et al. | 414/799 |

FOREIGN PATENT DOCUMENTS

| | | |
|---|---|---|
| AU | A-22597/83 | 6/1984 |
| FR | 2482060 | 11/1981 |
| GB | 1596789 | 8/1981 |
| GB | 2267269 | 12/1993 |

* cited by examiner

Primary Examiner—Joseph A. Fischetti
(74) Attorney, Agent, or Firm—Gary M. Cohen

(57) ABSTRACT

A transfer apparatus for an article or group of articles includes a carriage assembly (6) for moving an article substantially horizontally from a first location to a second location. The carriage assembly (6) includes an elongate transfer member (19) and a conveyor (20) which is movable relative to the elongate transfer member (19). A support (1) engages and supports the carriage assembly (6) so that the elongate transfer member (19) is movable substantially vertically on the support (1).

17 Claims, 16 Drawing Sheets

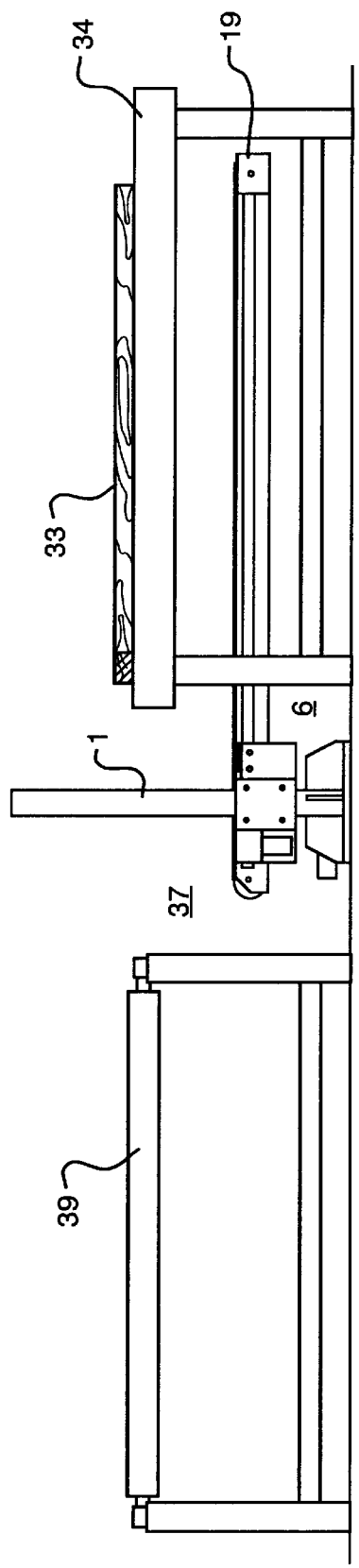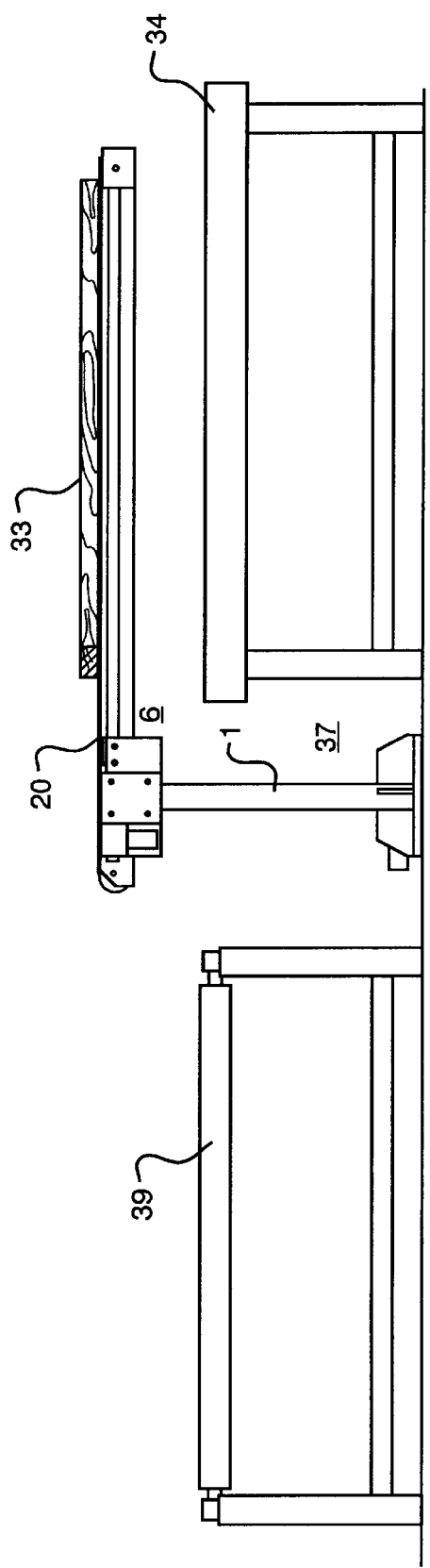

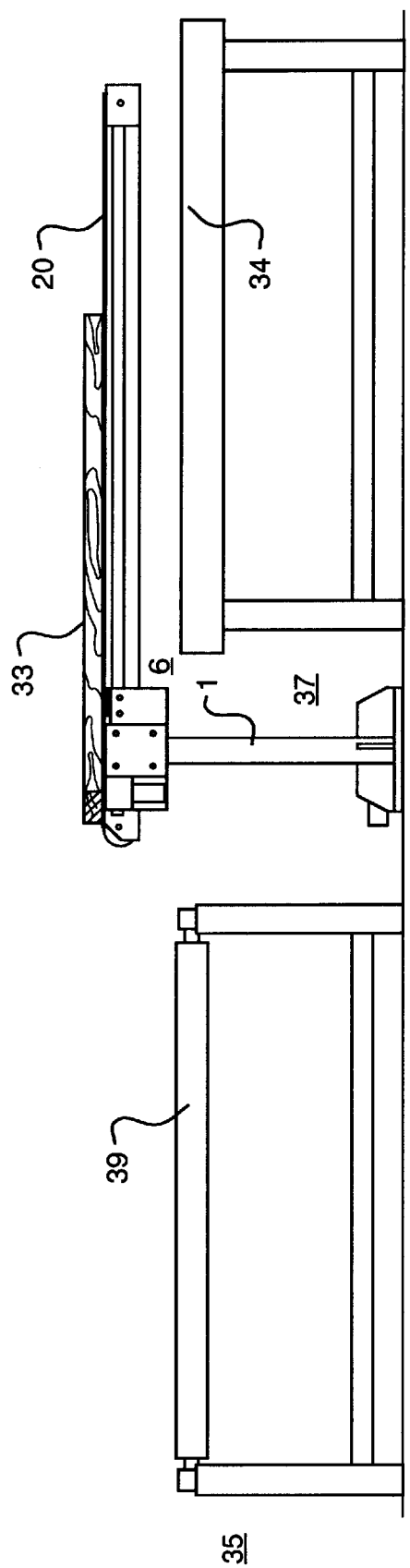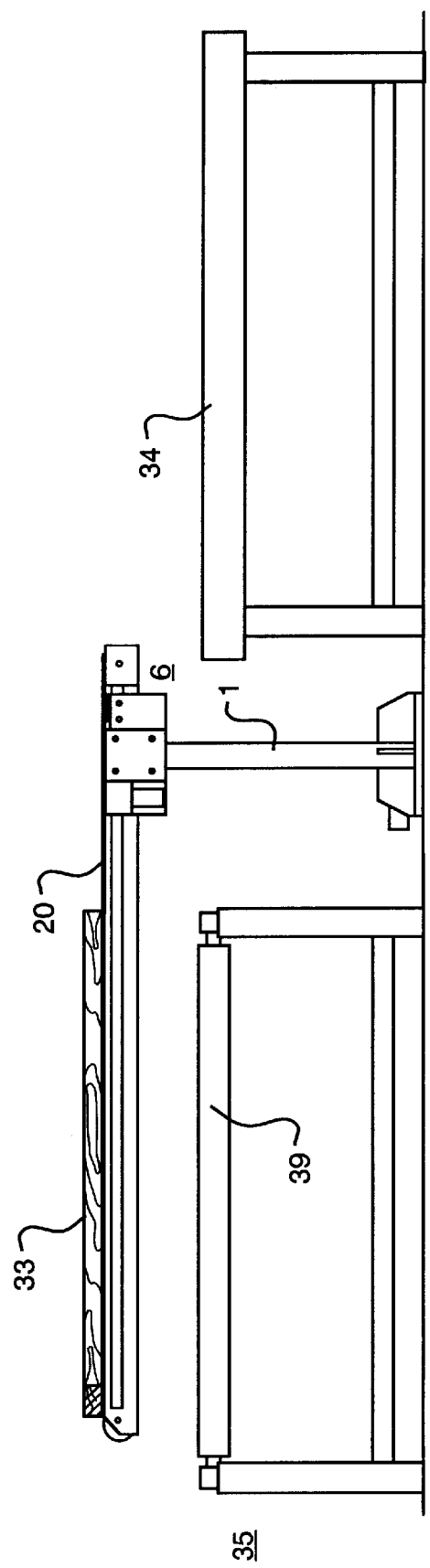
FIG. 5
FIG. 6

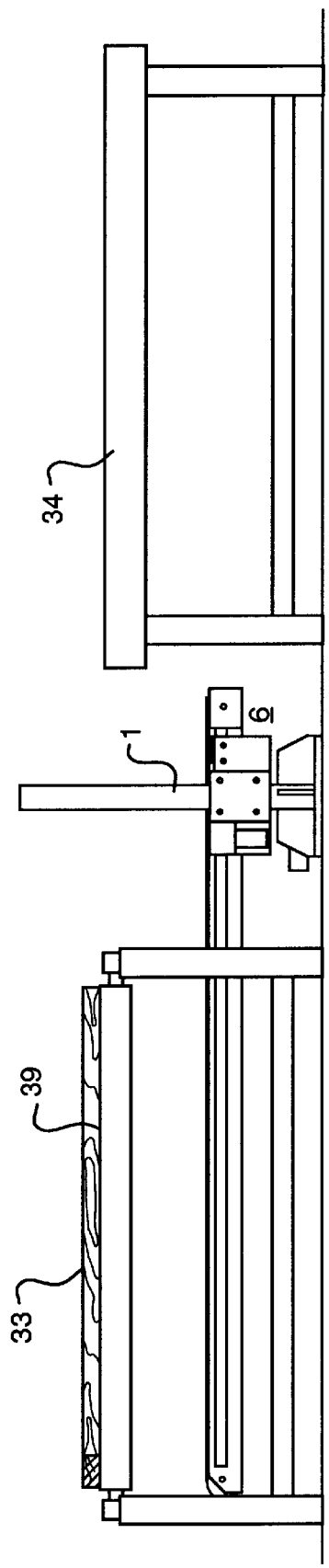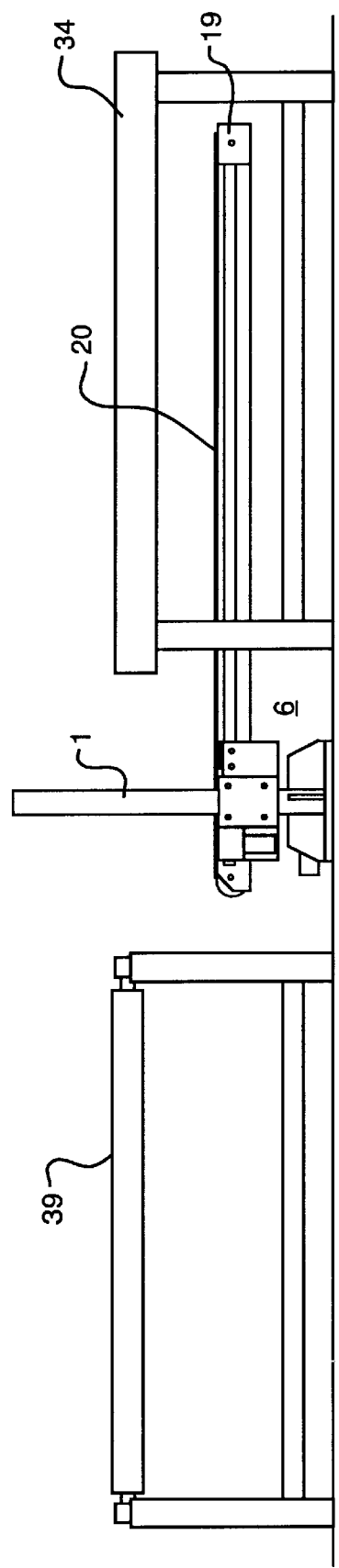

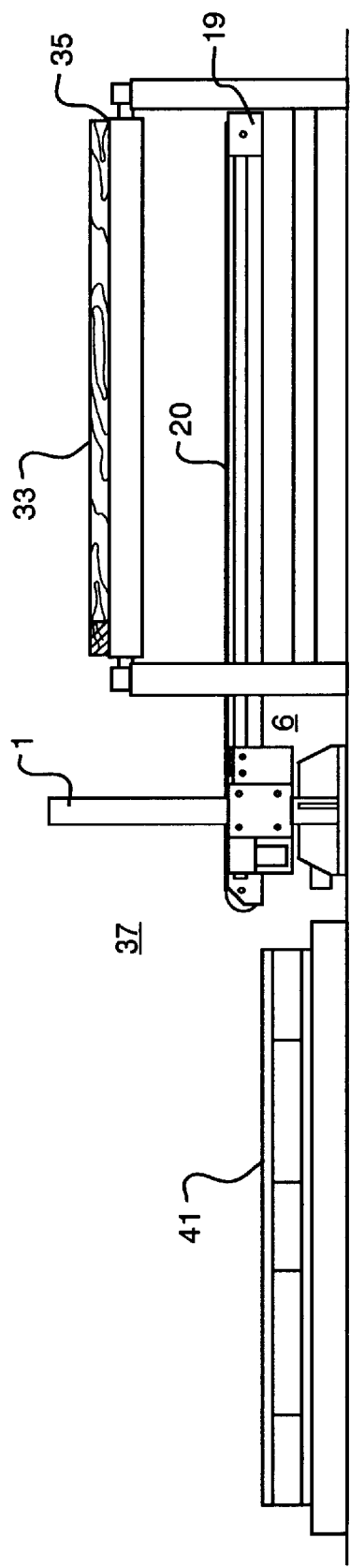
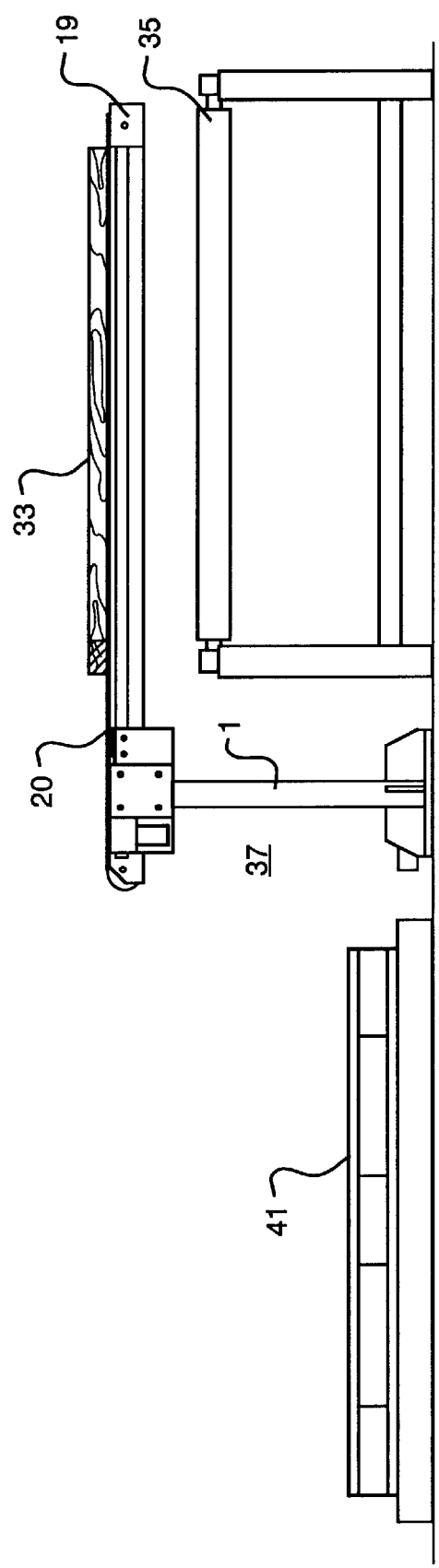
FIG. 9
FIG. 10

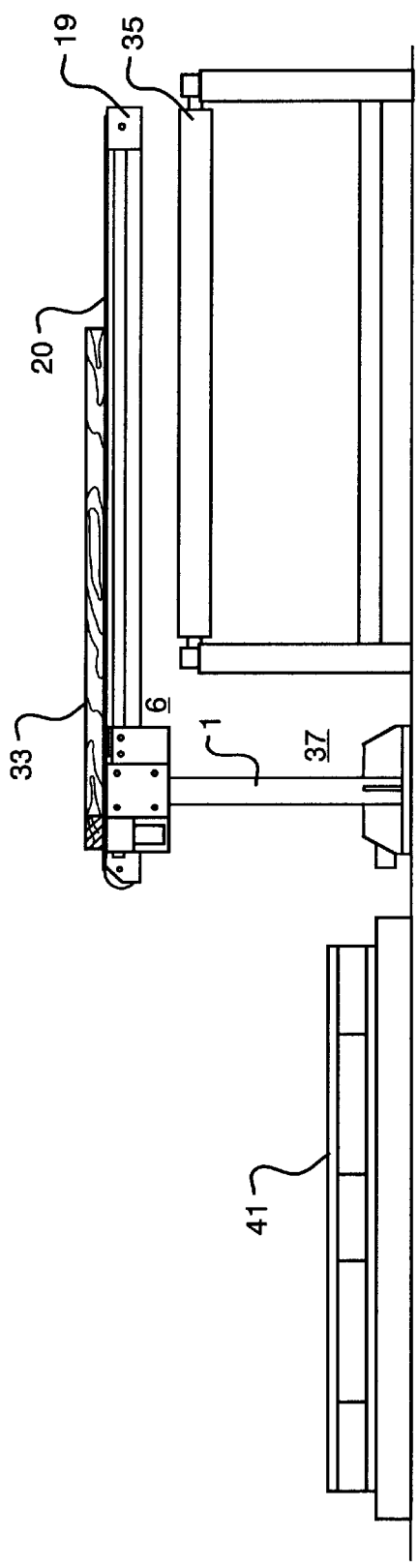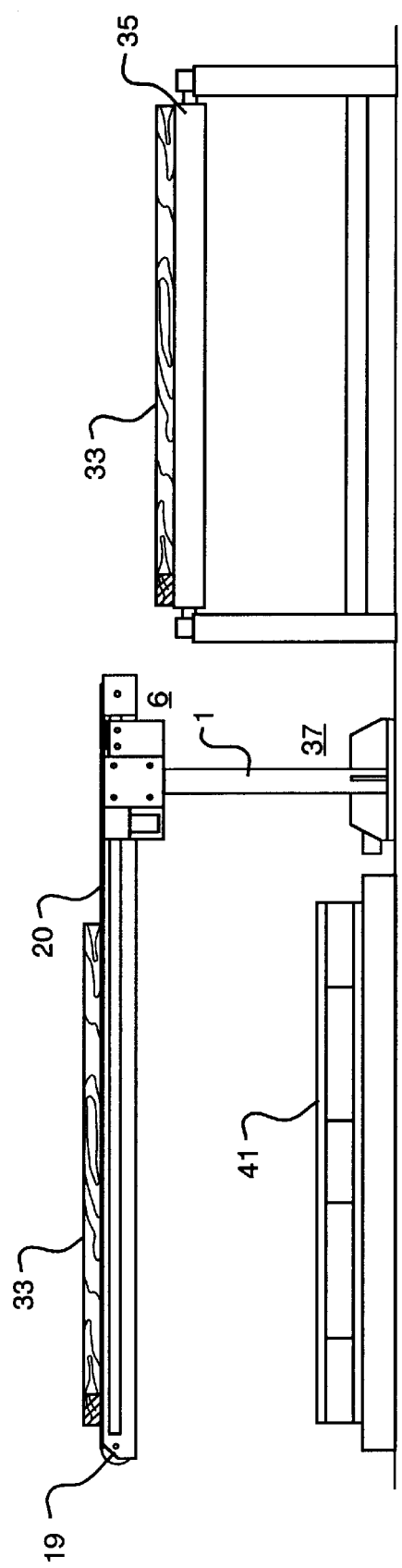

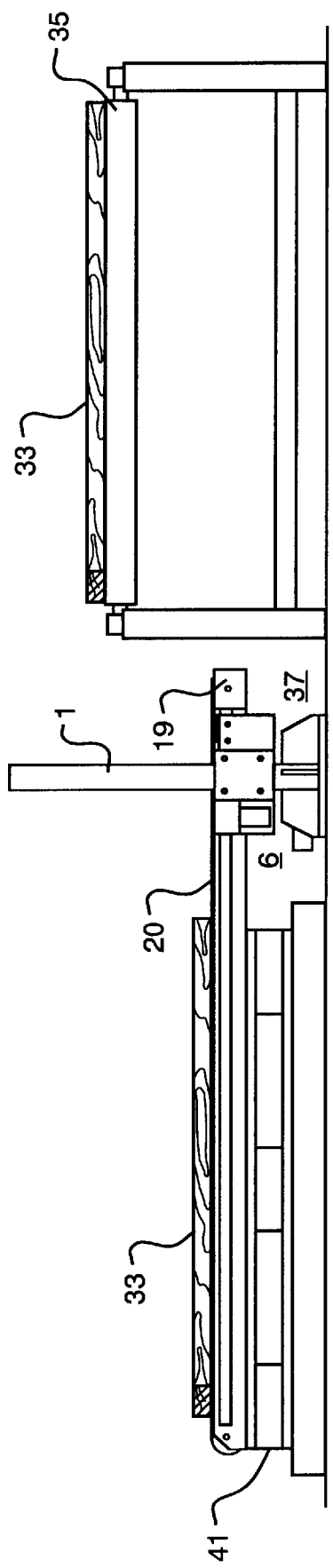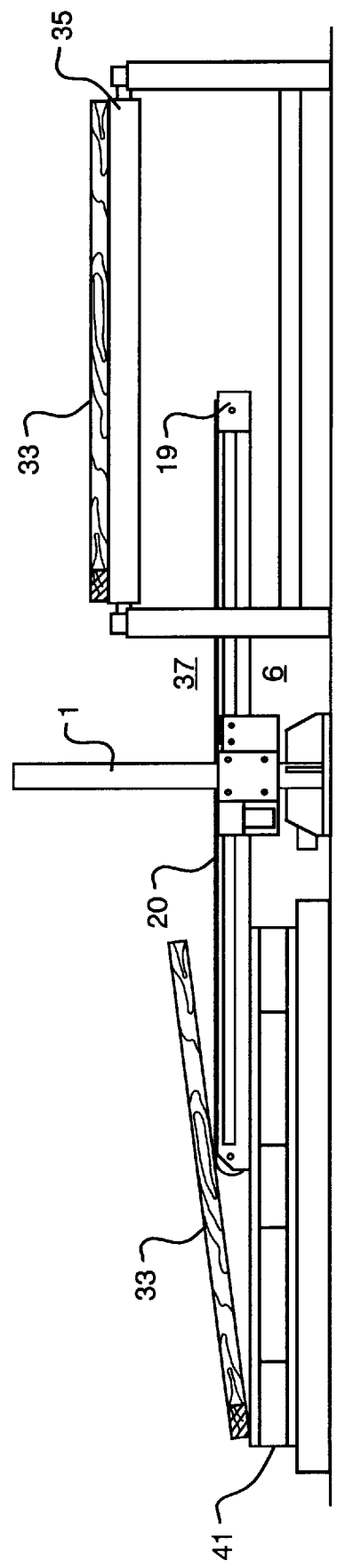

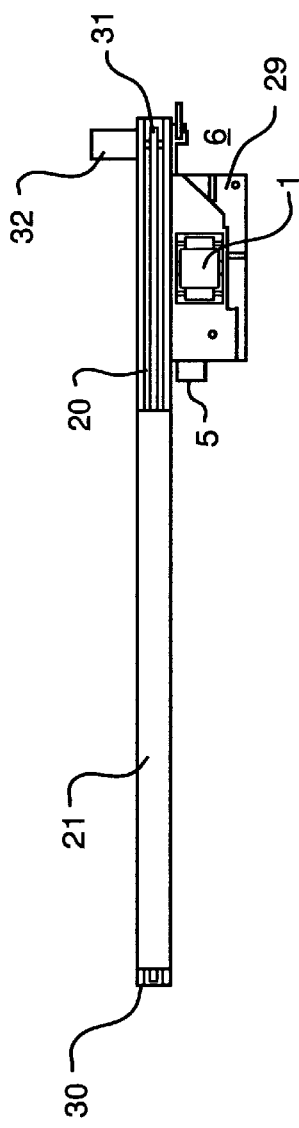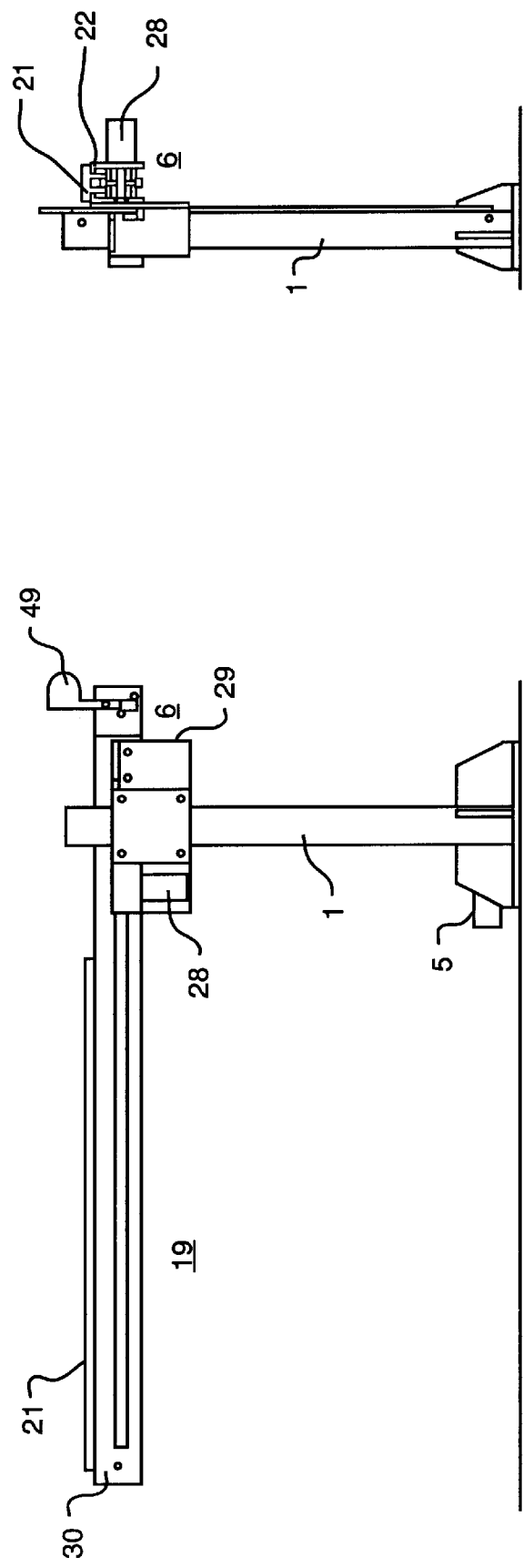
FIG. 17A
FIG. 17B
FIG. 17C

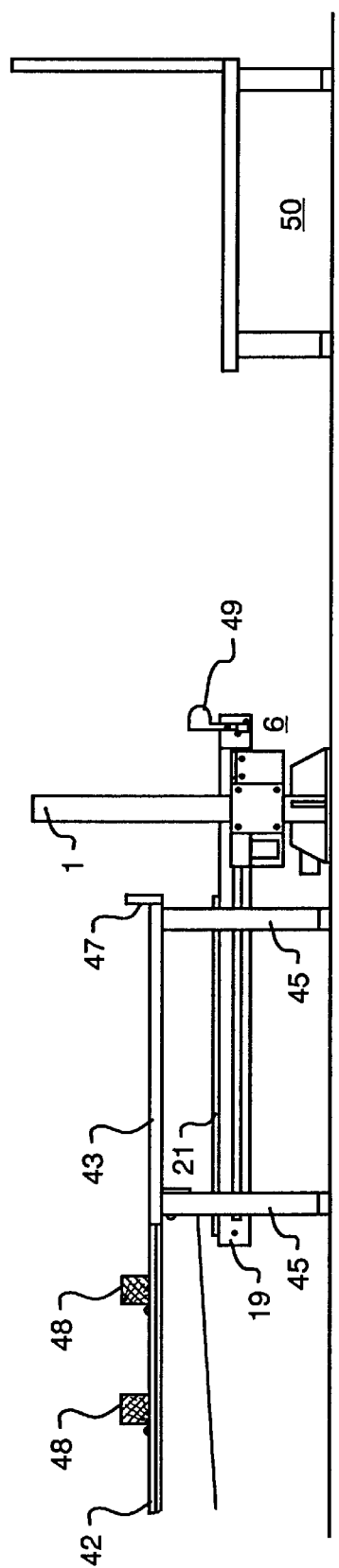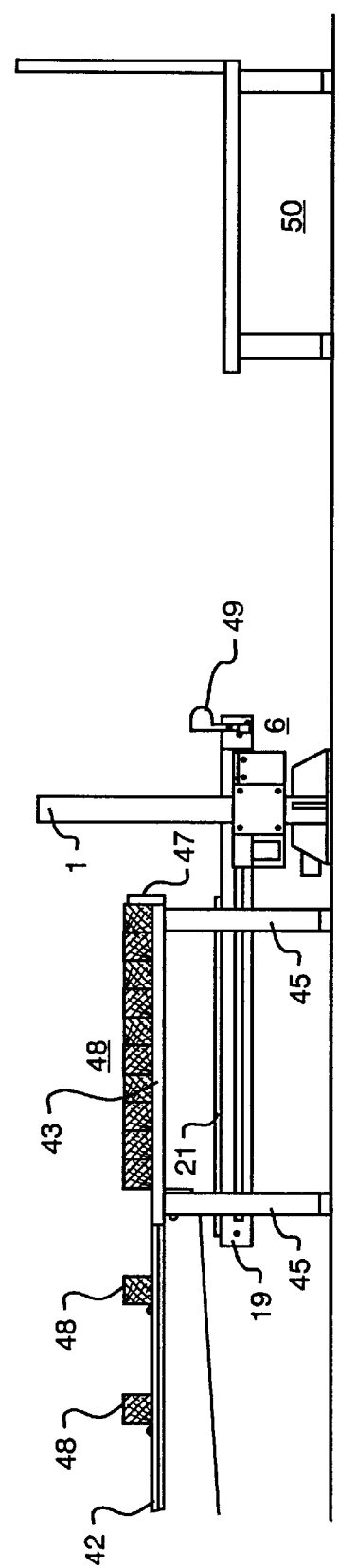

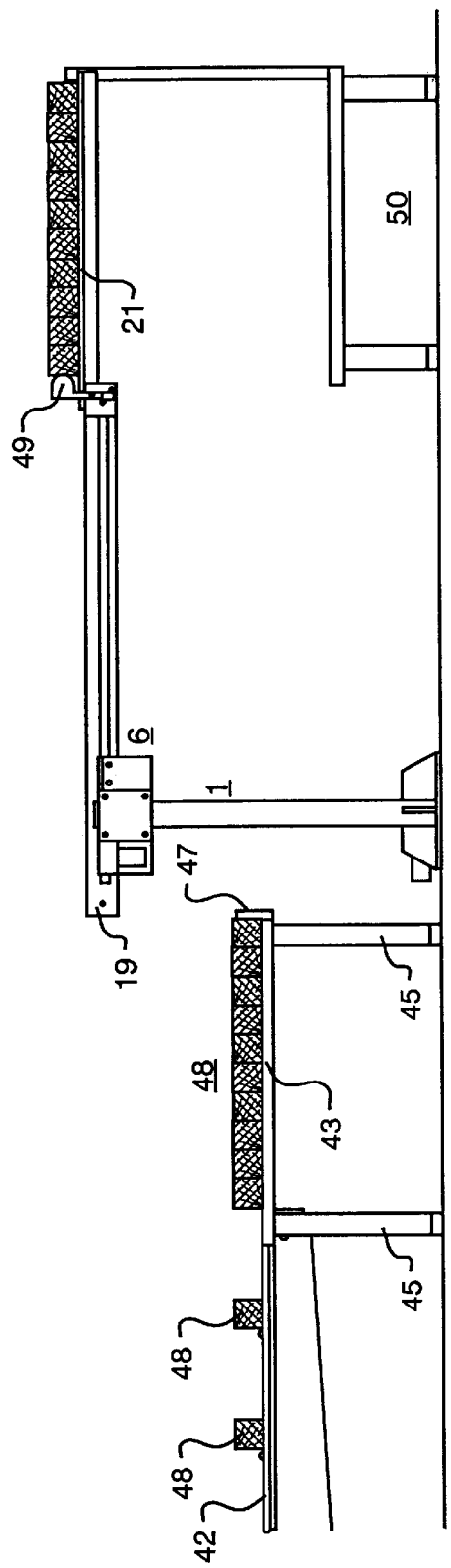
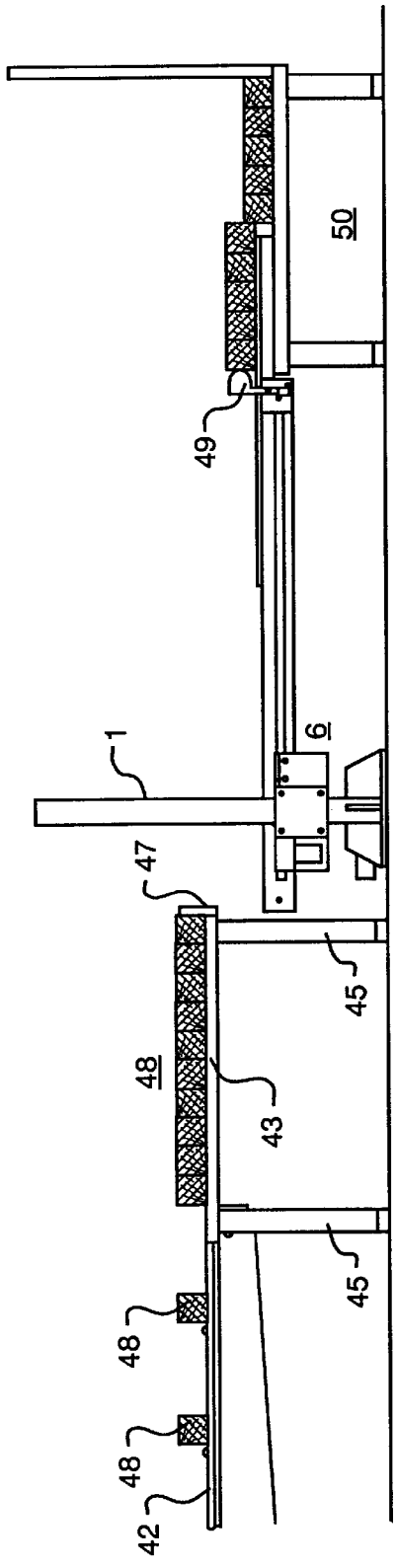
FIG. 24
FIG. 25

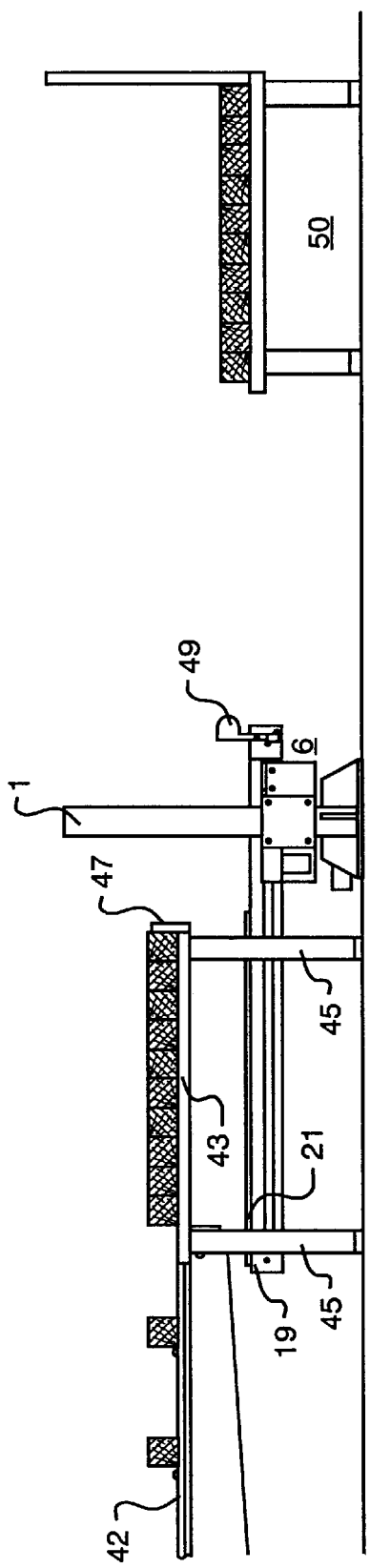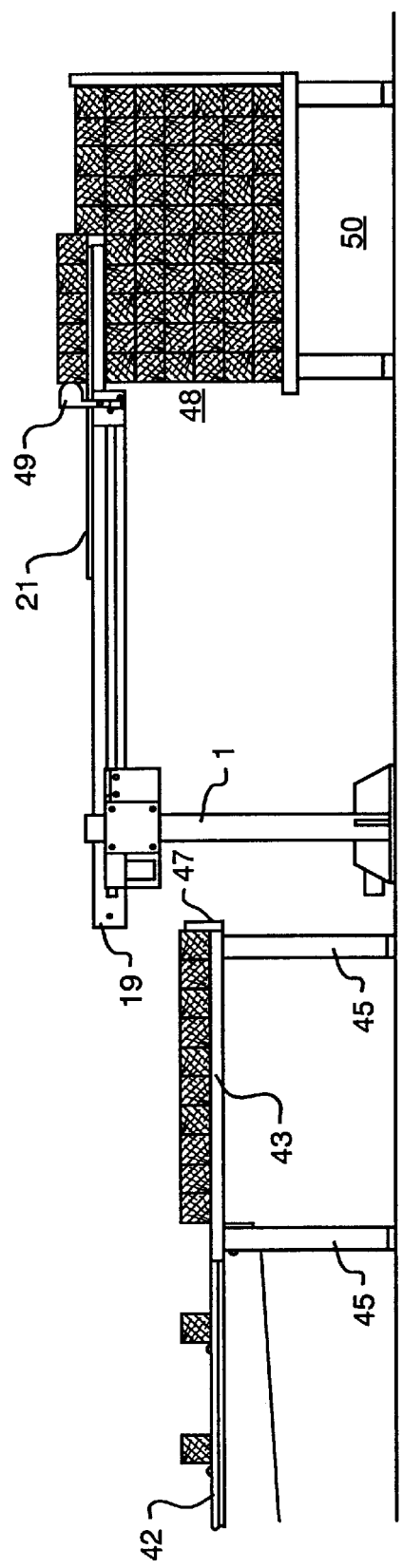

ARTICLE TRANSFER APPARATUS

FIELD OF THE INVENTION

The invention relates to a transfer apparatus for articles or groups of articles. More particularly, the transfer apparatus is useful for moving and/or stacking prefabricated building components (such as trusses) or other building components (such as cut timber). It may also be useful in transferring other movable and/or stackable articles (such as plastic sheet, plastic pipe, injection moulded plastic articles, sheet and formed metal articles, aluminium extrusions, glass, laminated and composite timber articles, cardboard).

BACKGROUND OF THE INVENTION

Whilst the following discussion concerns a transfer apparatus for trusses and cut timber, it is to be understood that the same principles apply to moving and/or stacking other articles as indicated above.

Traditionally, trusses that are destined for the building industry may be constructed on-site or prefabricated. Prefabricated trusses of standard designs are very popular as they can be mass produced in a jig that can be part of a production line using less technically skilled persons than carpenters. Consequently, considerable time and costs saving can be achieved.

Typically these trusses are up to 15 meters long, 4.2 meters high and weigh up to 210 kg. Because of these dimensions the trusses are difficult to remove from a jig, to stack for storage and transport, or to be moved to other parts of the fabrication site for further processing.

There have been many attempts to automate the fabrication of trusses and the transfer of these trusses.

One attempt is disclosed in U.S. Pat. No. 3,984,010. In this patent a truss is fabricated on a conveyor system of driven rollers. The trusses are stacked vertically by a tilt mechanism that has a pair of arms extending between driven rollers. These arms are rotated about one end to elevate the truss to a substantially vertical position. Whilst placing the trusses in the upright position assists orderly transport, it does not allow easy subsequent processing of a truss that usually requires it to be substantially horizontal. A similar approach is disclosed in U.S. Pat. No. 4,339,117.

Another approach is disclosed in U.S. Pat. No. 4,439,098 that proposes a horizontal truss stacker. A cradle is provided at the end of a truss assembly line as a short continuation of the conveyor. It receives the truss and by vertical movement allows other trusses to also be received and a stack formed. A fork lift is then used to remove the stack after the cradle is partially released.

Another horizontal truss stacker is disclosed in U.S. Pat. No. 5,468,118. In this patent a truss is fabricated on a conveyor system of driven rollers. Support arms, which can be moved vertically, are provided between the driven rollers to lift and support the truss from the rollers. These arms can extend telescopically to move the truss to the side of the conveyor system. The truss is removed from the support arms by it engaging stops on stands to receive the truss.

A similar problem to that which exists with truss movement is found in the movement of other articles from machines that are processing or conveying articles, one at a time. For example, the cutting of standard size lengths of timber on a continuous basis from a machine. As the cut timber issues from the cutting machine, it is manually collected or stacked and transported from the site. This is both labor intensive and expensive. Similar problems also exist in the area which processes plastic sheet, plastic pipe, injection moulded plastic articles, sheet and formed metal articles, aluminium extrusions, glass, laminated and composite timber articles, and cardboard.

OBJECT OF THE INVENTION

It is an objective of the present invention to provide an automated or semi-automated transfer apparatus that permits an article or group of articles to be transferred to a specific location quickly.

SUMMARY OF THE INVENTION

According to the invention a transfer apparatus is provided for an article or group of articles including:
(a) carriage means to move an article substantially horizontally from a first position to a second position, the carriage means including:
  (i) an elongate transfer member; and
  (ii) conveyor means movable relative to the elongate transfer member; and
(b) support means engaging and supporting the carriage means, the carriage means movable substantially vertically on the support means.

Preferably, the transfer apparatus further includes first drive means to move the conveyor means relative to the elongate member and first control means to control the first drive means to cause the conveyor means to move in a predetermined fashion.

Preferably, the transfer apparatus further includes second drive means to move the carriage means relative to the support means and second control means to control the second drive means to cause the carriage means to move in a predetermined fashion relative to the support means.

Typically the drive means is a motor that is electrically, hydraulically or pneumatically actuated. The drive means may further include chains and pulleys to translate the motive force to the carriage and its components.

The control means may be computer based and include a series of micro-switches.

According to a preferred form of the invention, the carriage means further includes a finger or a fork extendable from the conveyor means and preferably substantially parallel to the conveyor means.

According to another preferred form of the invention, the elongate transfer member is a beam and the conveyor means is a belt conveyor. Typically, the belt conveyor is an endless belt movable longitudinally along the beam and engaging guides located at or adjacent each end of the beam. 11. Preferably the elongate transfer member further includes a selectively displaceable upstanding stop member.

Preferably the support means is a column and includes a base to be affixed to a foundation and mounting sites for the drive means.

A transfer system is also provided, according to the invention, which includes two or more of the transfer apparatus. Typically, these transfer apparatus are spaced apart to support the article or group of articles. Obviously the operation of each transfer apparatus is synchronised with the other transfer apparatus.

A method of transferring an article or groups of articles is also provided which includes the steps of:
(a) locating an elongate transfer member in a first position under the article or group of articles to be transferred;
(b) moving the elongate transfer member on a support means to move the article or group of articles upwardly to a second position;

(c) activating a conveyor means located on the elongated transfer member to move the article or group of articles to a third position;

(d) moving the elongate transfer member substantially horizontally to move the article or group of articles to a fourth position;

(e) moving the elongate transfer member on the support means to move the article or group of articles downwardly to a fifth position in which the article or group of articles is to be deposited.

The steps (c) and (d) may be interchanged sequentially or carried out simultaneously or otherwise synchronously.

Accordingly, by employing conveyor means with the elongate transfer member, it is possible to transfer an article or group of articles from one point to another. In the case of trusses, the truss may be transferred from a jig or assembly conveyor and accurately deposited on a stack or subsequent conveyor. In the case of cut timber the timber can be assembled on transfer fingers and accurately aligned upon a stack.

In another preferred form of the invention, a method of transferring an article or group of articles from a conveyor means located on a elongate transfer member to a deposit site is also provided, which includes the step of moving the conveyor means at a predetermined rate in a first direction whilst synchronously moving the elongated transfer member in an opposite direction at the same or substantially the same predetermined rate.

Accordingly, in this preferred form, the article or group of articles may be accurately deposited as there is no relative movement between the conveyor and the truss during the deposit step. This is accomplished by matching the withdrawal rate of the elongate transfer member in one direction and the conveyor means speed in the opposite direction.

DESCRIPTION OF THE DRAWINGS

The invention will now be further explained and illustrated by reference to the accompanying drawings in which:

FIG. 3 is a side elevation of step I;

FIG. 4 is a side elevation of step II of the sequence;

FIG. 5 is a side elevation of step III of the sequence;

FIG. 6 is a side elevation of step IV of the sequence;

FIG. 7 is a side elevation of step V of the sequence;

FIG. 8 is a side elevation of step VI of the sequence;

FIG. 9 is a side view of step I of a second sequence of the operation of the transfer apparatus according to FIG. 1 of transferring a truss from a conveyor to a stack;

FIG. 10 is a side elevation of step II of the sequence;

FIG. 11 is a side elevation of step III of the sequence;

FIG. 12 is a side elevation of step IV of the sequence;

FIG. 13 is a side elevation of step V of the sequence;

FIG. 14 is a side elevation of step VI of the sequence;

FIG. 17A is a plan view of a second transfer apparatus according to a second form of the invention;

FIG. 17B is a side view of the transfer apparatus in FIG. 17A;

FIG. 17C is an end elevation view of the transfer apparatus in FIG. 17A;

FIG. 20 is a side view of step I of a sequence of the operation of the second transfer apparatus according to FIG. 17 of transferring cut timber from a conveyor to a stack;

FIG. 21 is a side elevation of step II of the sequence;

FIG. 24 is a side elevation of step V of the sequence;

FIG. 25 is a side elevation of step VI of the sequence;

FIG. 26 is a side elevation of step VII of the sequence;

FIG. 27 is a side elevation of step VIII of the sequence;

In the drawings like elements are designated by the same numbers.

Elevating Post

Figure 1A:
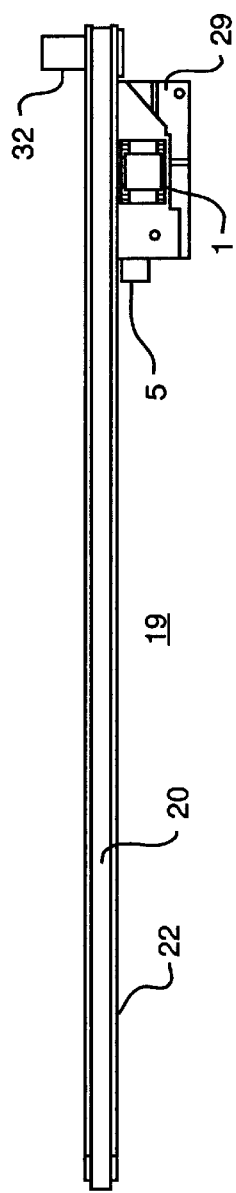
FIG. 1A is a plan view of a first transfer apparatus according to one form of the invention.

The elevating post 1 is best shown in FIGS. 1A, 1B, 1C, 17A, 17B, 17C, 28, and 30.

The elevating post 1 has a pair of vertically spaced pulleys 2 and 3 (see FIG. 28), and a chain 4 which engages about and spans between the pulleys 2 and 3. The path of the chain 4 is partially internal of post 1 and partially external of post 1. The chain 4 is driven by a geared motor 5. This geared motor 5 may be hydraulic, electric or pneumatic. The chain 4 is connected at each of its ends to a carriage 6 and raises and lowers the carriage 6 on post 1 when driven by motor 5.

Rail System

Figure 18:
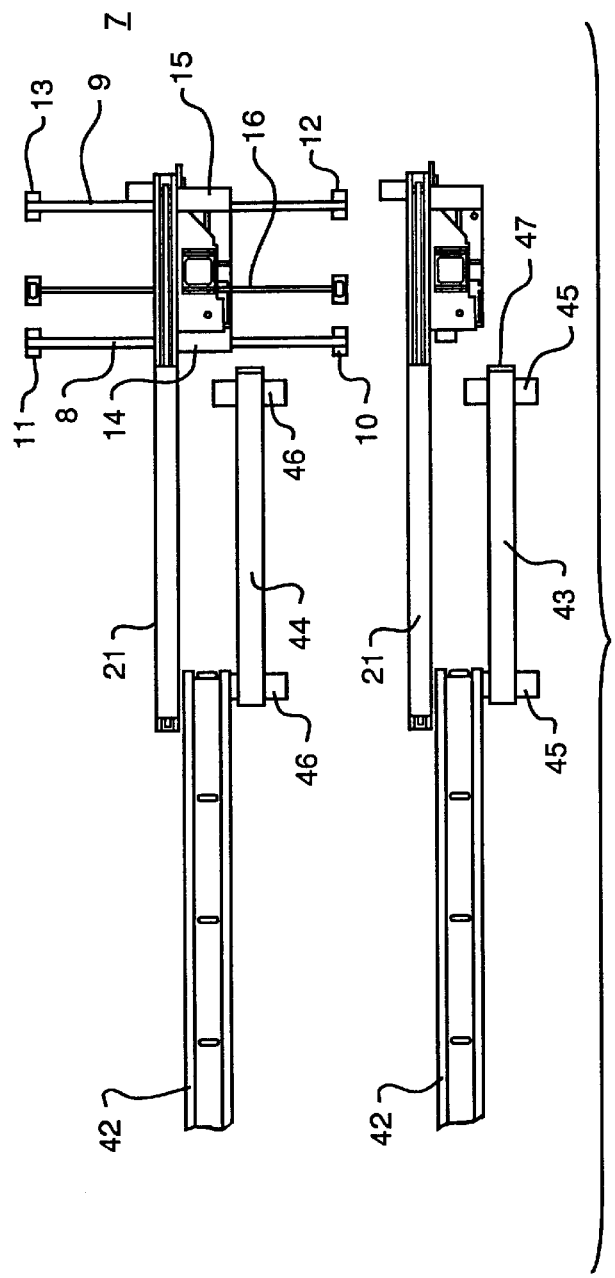
FIG. 18 is a plan view of the second transfer apparatus of FIG. 17 at the end of a conveyor.
Figure 30:
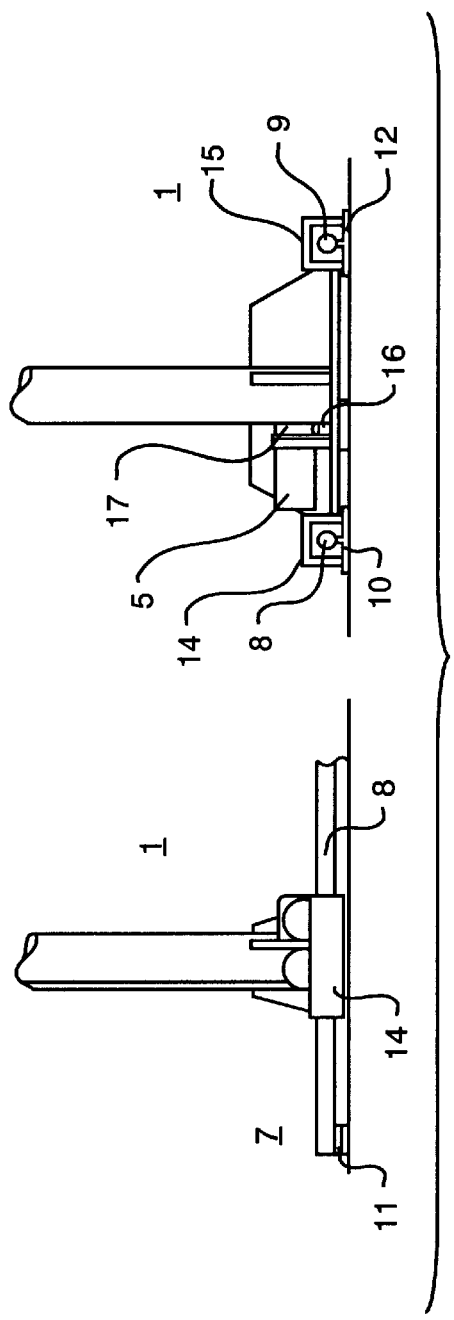
FIG. 30 is a partial side elevation of the rail system used in the second transfer apparatus of FIG. 18.
Figure 28:
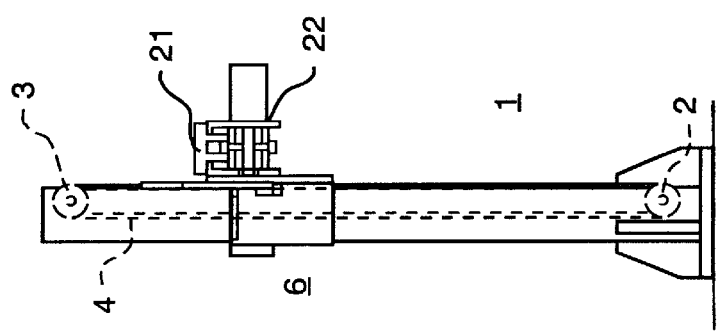
FIG. 28 is a side elevation of the support post of the first and second transfer apparatus of FIGS. 1 and 17.

The elevating post 1 may be fixed to a foundation by any suitable means or be mounted upon a rail system 7 as best shown in FIGS. 18 and 30.

The rails system 7 consists of two pipes 8 and 9, (tubes or round bars) that are elevated above the ground by a vertical support plates 10 and 11, and 12 and 13 respectively. Encompassing the pipes 8 and 9 are plastic bearings that are housed in steel shrouds 14 and 15. The steel shrouds 14 and 15 are connected to the base of the elevating post 1.

A chain rack 16 (fixed at both ends of the conveyor line) passes over a pulley 17 mounted on motor 5 that is fixed to the base of the elevating post. Consequently, where a pair of elevating posts 1 are used as in FIG. 18, the distance between the elevating posts 1 may be readily adjusted.

The Carriage

The carriage 6 includes a transfer beam 19, conveyor 20 and optionally a finger or fork 21.

Transfer Beam

Figure 29:
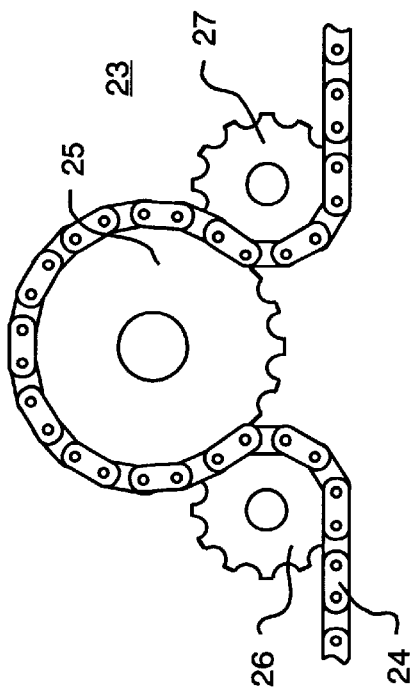
FIG. 29 is a side elevation of an idler gear used in the first and second transfer apparatus of FIGS. 1 and 17.

The transfer beam 19 includes an extrusion 22 (eg. aluminium or steel) in which horizontal mounting wheels 23 are mounted. As more particularly shown in FIG. 29, a chain 24 engages wheels 25, 26 and 27 and is fixed at its ends to opposite ends of transfer beam 19. A motor 28 is fixed on carriage 29 and drives wheel 25. This, in turn, drives wheels 26 and 27 and transfer beam 19 is caused to move in either direction depending upon the drive direction of motor 28.

Conveyor

Figure 1C:
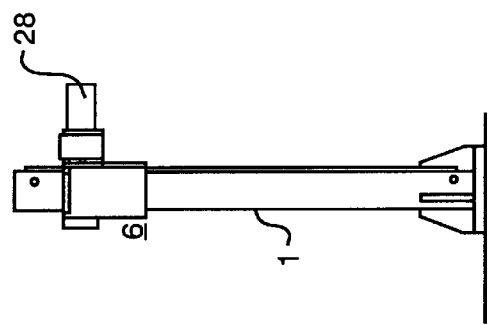
FIG. 1C is an end elevation view of the transfer apparatus in FIG. 1A.
Figure 1B:
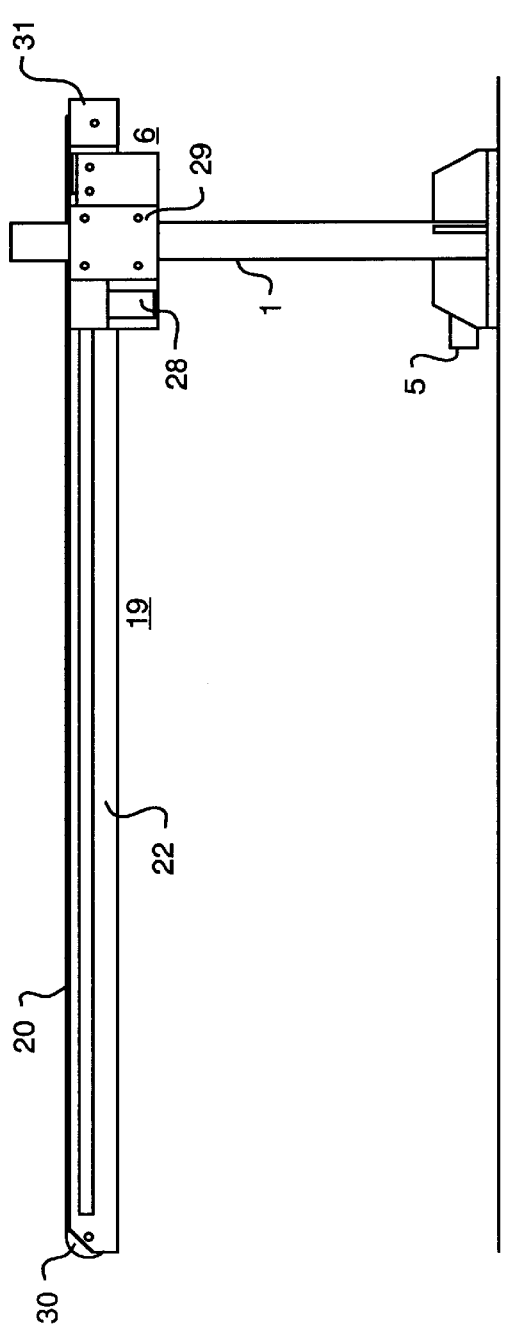
FIG. 1B is a side view of the transfer apparatus in FIG. 1A.
Figure 2:
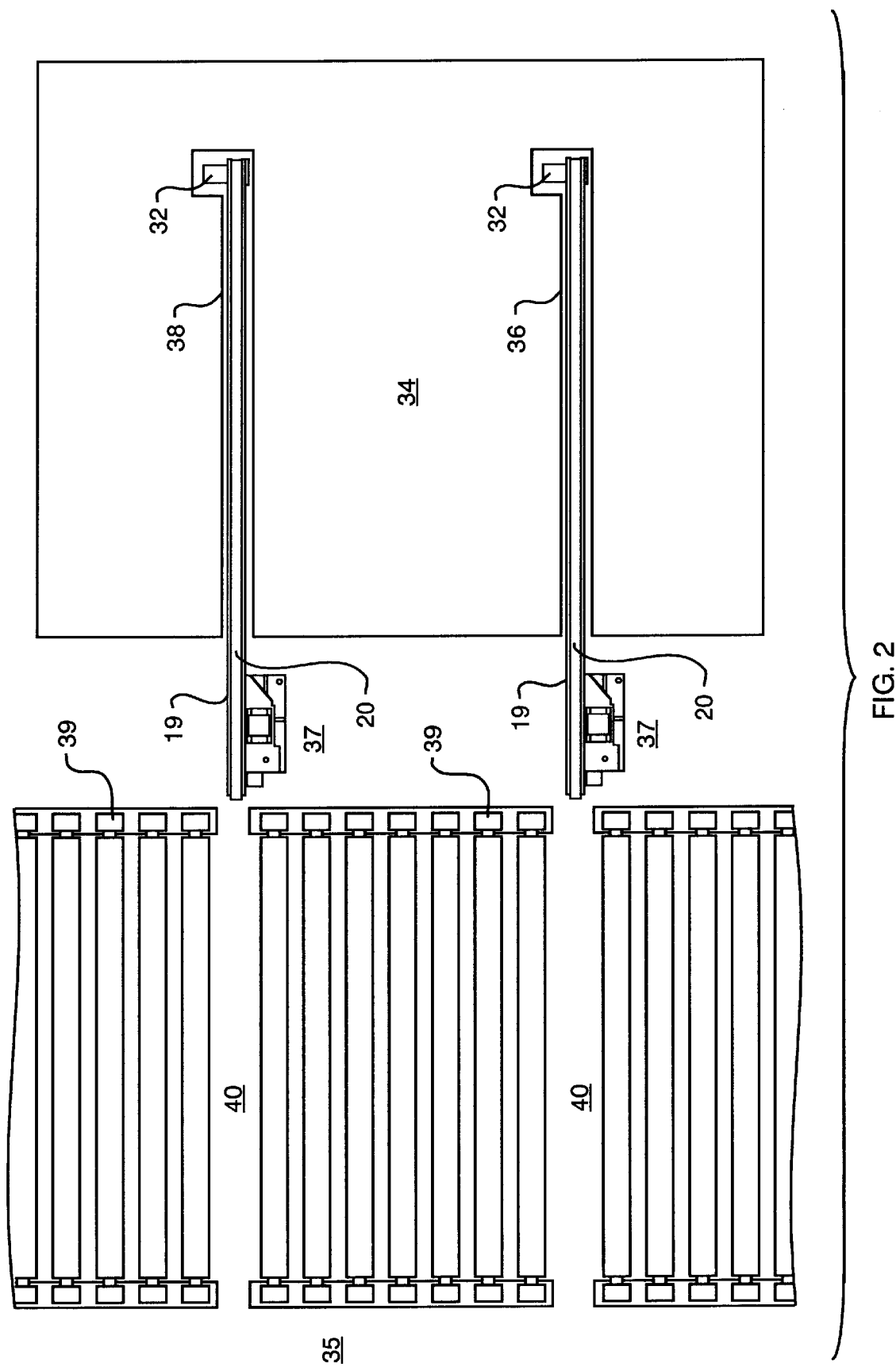
FIG. 2 is a plan view of step I of a first sequence of the operation of the transfer apparatus according to FIG. 1 of transferring a truss from a jig to a conveyor.
Figure 15:
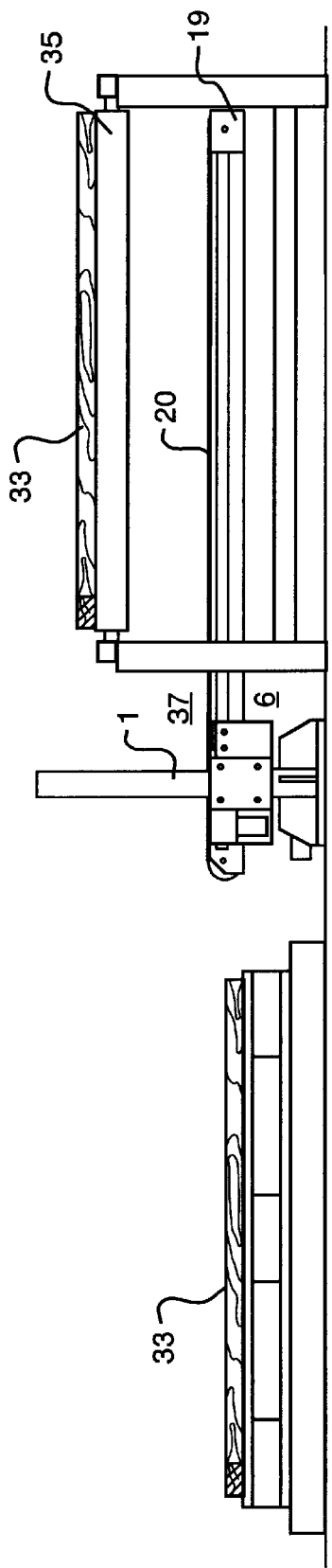
FIG. 15 is a side elevation of step VII of the sequence.

A conveyor 20 runs along the length of both the upper and the lower longitudinal sides of the transfer beam 19, as best seen in FIGS. 1A, 1B and 1C, and in FIGS. 17A, 17B and 17C. This passes over pulleys 30 and 31. Pulley 31 is driven by motor 32, which may be hydraulic, electric or pneumatic.

In FIGS. 1A, 1B and 1C, the conveyor 20 is a belt.

In contrast to this, in FIGS. 17A, 17B and 17C, the conveyor 20 is a belt or chain which moves along and in the cavities of the extrusion of transfer beam 19.

Finger or Fork

Figure 23:
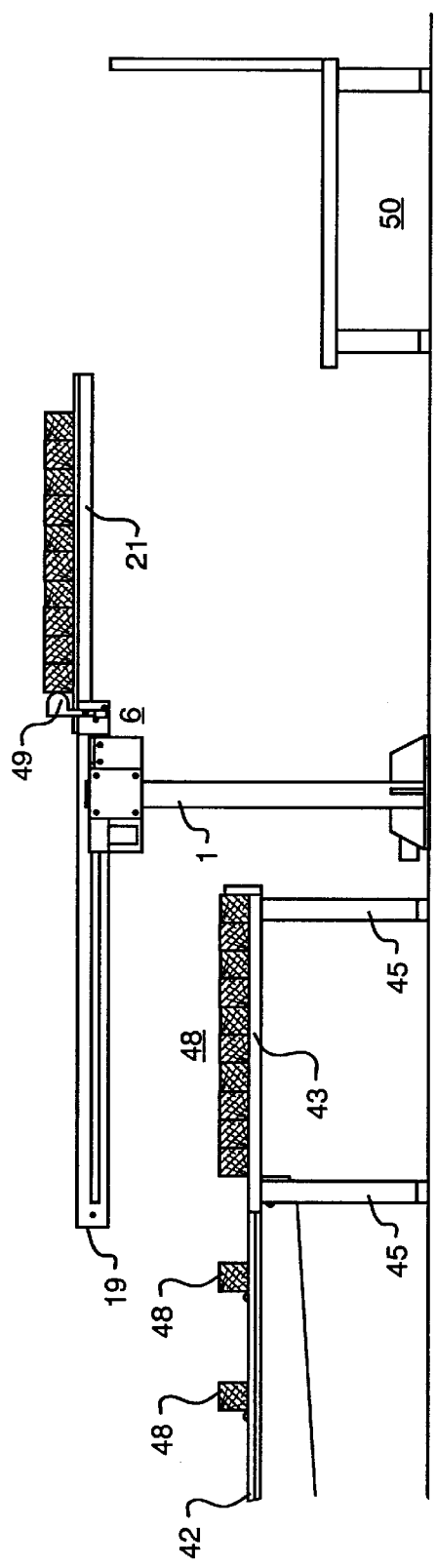
FIG. 23 is a side elevation of step IV of the sequence.

As more clearly shown in FIGS. 17A, 17B and 17C, a substantially horizontal finger or fork 21 is connected to the conveyor 20. Motor 32, when actuated, will move the finger or fork 21 so it extends from one end of the transfer beam 19, as shown in FIG. 23.

Sequences of Operation

The figures show three different operation sequences as follows. In each case the individual operations can be initiated and stopped by series of micro switches. The whole operation may be automated.

FIGS. 2 to 8

FIGS. 2 to 8 depict the transfer of a truss 33 from a jig 34 to a conveyor 35 by two transfer apparatus 37.

Step I (FIGS. 2 and 3): The transfer beams 19 have been extended to the right of the elevating post 1 so they are located under jig 34. Openings 36 and 38 are vertically aligned with transfer beams 19. A truss 33 is fabricated in jig 34.

Step II (FIG. 4): The elevating posts 1 have been activated to raise carriage 6, and therefore transfer beams 19, above jig 34. Truss 33 is lifted free of jig 34.

Step III (FIG. 5): The conveyors 20 move the truss 33 to a predetermined position adjacent the left end of the transfer beams 19.

Step IV (FIG. 6): The carriages 6 then move the transfer beams 19 to the left. The movement ceases when the truss 33 is aligned above the conveyor 35.

Step V (FIG. 7): The carriages 6, and therefore the transfer beams 19, are lowered. The transfer beams 19 pass between sets of rollers 39 through gaps 40 (see FIG. 2). The truss 33 is deposited on the rollers 39.

Step VI (FIG. 8): The transfer beams 19 are moved to the right to return to step I.

FIGS. 9 to 16

FIGS. 9 to 16 depict the transfer of a truss 33 from a conveyor 35 to a pallet 41 by two transfer apparatus 37.

Step I (FIG. 9): The transfer beams 19 have been extended to the right of the elevating post 1 so they are located under conveyor 35. Openings 36 and 38 are vertically aligned with transfer beams 19 (see FIG. 2). A truss 33 is moved along the conveyor 35 and stopped over the transfer beams 19.

Step II (FIG. 10): The elevating posts 1 have been activated to raise carriage 6, and therefore transfer beams 19, above conveyor 35. Truss 33 is lifted free of conveyor 35.

Step III (FIG. 11): The conveyors 20 move the truss 33 to a predetermined position adjacent the left end of the transfer beams 19.

Step IV (FIG. 12): The carriages 6 then move the transfer beams 19 to the left. The movement ceases when the truss 33 is aligned above the pallet 41.

Step V (FIG. 13): The carriages 6, and therefore the transfer beams 19, are lowered onto pallet 41.

Step VI (FIG. 14): The transfer beams 19 are moved to the right while the conveyors 20 simultaneously move anti-clockwise at substantially the same speed as the movement of the transfer beams 19. The effect is that the transfer beams 19 are peeled away from under the truss 33 without any substantial misalignment of the truss 33 with the pallet 41.

Step VII (FIG. 15): The transfer beams 19 are moved to the right to return to step I.

Figure 16:
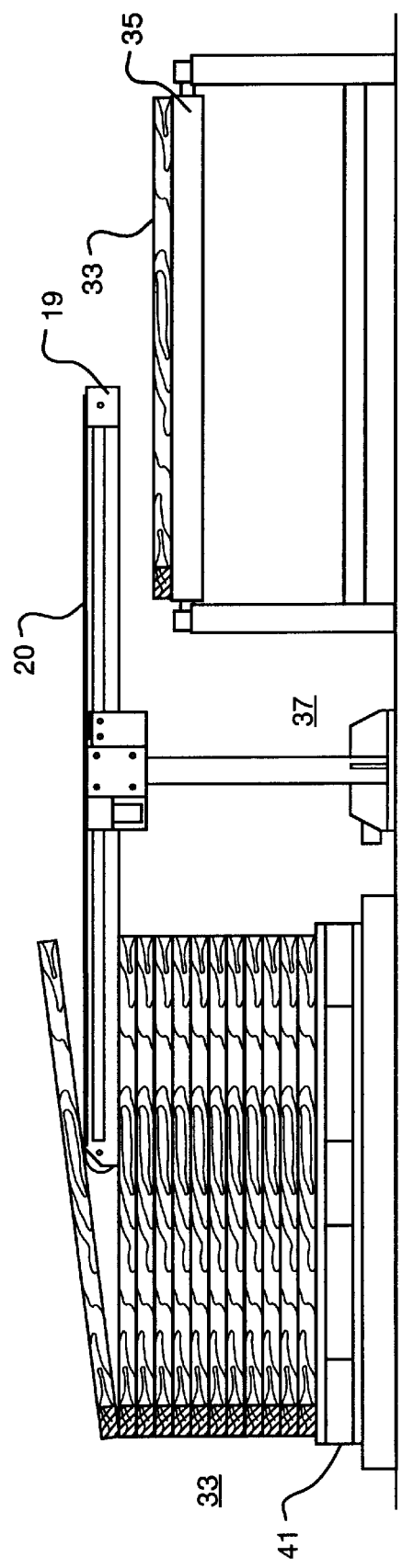
FIG. 16 is a side elevation of a stack formed by carrying out the second sequence a number of times.

FIG. 16 depicts the above sequence carried out a number of times to form an aligned stack of trusses 33 on pallet 41.

FIGS. 18 to 27

FIGS. 18 to 27 depict the transfer of a truss 33 from a conveyor 35 to a pallet 41 by two transfer apparatus 37.

Figure 19:
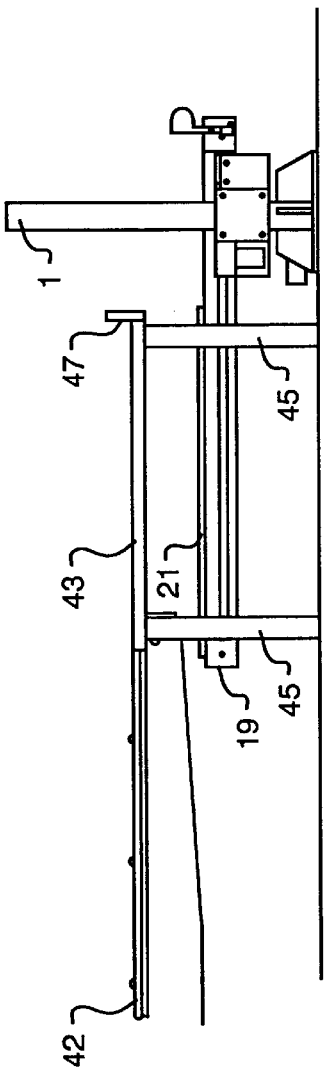
FIG. 19 is a side elevation of FIG. 18.
Figure 22:
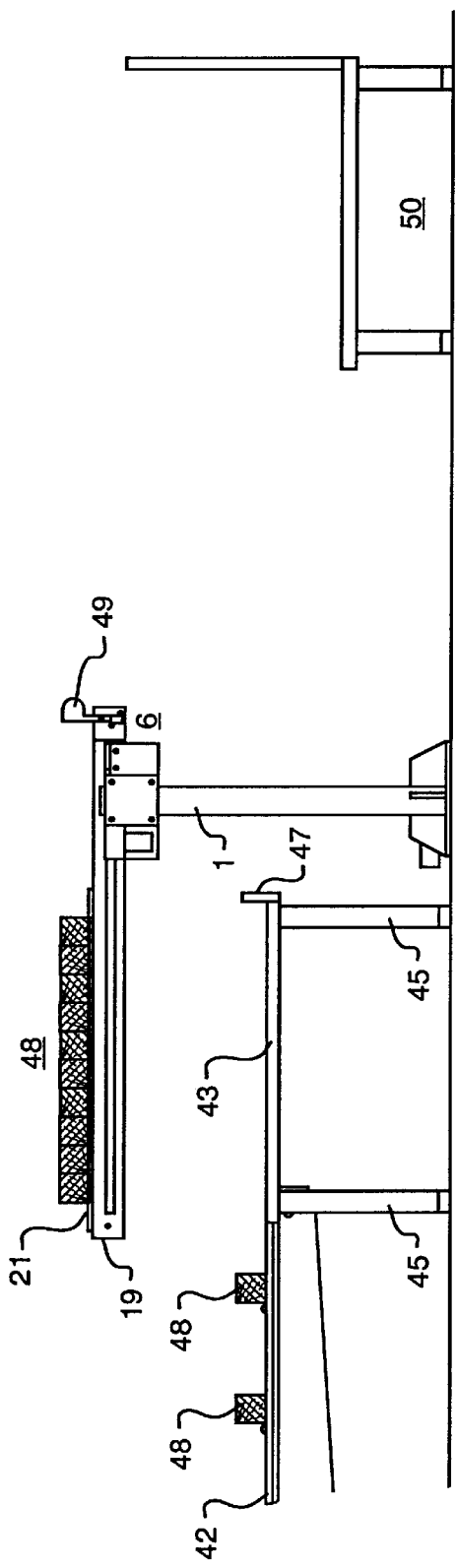
FIG. 22 is a side elevation of step III of the sequence.

In FIGS. 18 and 19, a conveyor line 42 is positioned downstream of a cutting machine (not shown). A pair of receiving surfaces 43 and 44 have legs 45 and 46 attached to them. Each surface 43 and 44 has an upright 47 to prevent cut material from flowing off the rear of the surfaces 43 and 44.

Step I (FIG. 20): The transfer beams 19 have been extended to the left of the elevating post 1 so they are located under the plane of the receiving surfaces 43 and 44. Cut timber 48 is moved along conveyors 42 onto receiving surfaces 43 and 44.

Step II (FIG. 21): The cut timber fill the entire width of the receiving surfaces 43 and 44, and uprights 47 provide a stop for the cut timber 48.

Step III (FIG. 22): The elevating posts 1 have been activated to raise carriage 6, and therefore transfer beams 19, above receiving surfaces 43 and 44. Cut timber 48 is lifted on finger or fork 21 and is free of the receiving surfaces 43 and 44, so those surfaces are ready to receive more cut timber 48.

Step IV (FIG. 23): The conveyors 20 move the finger or fork 21 to a predetermined position overhanging the right end of the transfer beam 19. This movement also rotates dog 49 clockwise and, once the cut timber clears the dog 49, the dog resiles into an upright position. The dog 49 is fixed so it cannot be rotated in the anti-clockwise direction. Meanwhile, the receiving surfaces 43 and 44 are receiving more cut timber 48.

Step V (FIG. 24): The carriages 6 then move the transfer beams 19 to the right. The movement ceases when the cut timber is vertically aligned above the pallet 50.

Step VI (FIG. 25): Carriages 6 are lowered on elevating post 1 until the finger or fork 21 contacts either the pallet 50 or an immediately preceding layer of cut timber 48. The finger or fork is then retracted by the conveyors 20 to the left. The cut timber 48 contacts dog 49, which acts as a stop and wipes the cut timber off the finger or fork 21 onto pallet 50.

Step VII (FIG. 26): The transfer beams 19 are then moved to the right to take up the initial position of step I.

FIG. 27 depicts the above sequence carried out a number of times to form an aligned stack of cut timber on pallet 50.

The transfer apparatus of the present invention combines the use of substantially vertical movement and dual substantially horizontal movements. Improvements and modifications will be readily apparent to those skilled in the art and are considered to be within the scope and spirit of the invention.

What is claimed is:

1. A transfer apparatus for an article or group of articles comprising:
 (a) a carriage for moving an article substantially horizontally from a first location to a second location, the carriage including,
  (i) an elongate transfer member which is received by the carriage for longitudinal movement within the carriage and which is horizontally movable relative to the carriage, and (ii) a conveyor which is received by the elongate transfer member for longitudinal movement along the elongate transfer member and which is movable relative to the elongate transfer member; and (b) a support engaging and supporting the carriage, wherein the carriage is movable substantially vertically on the support to move the elongate transfer member vertically from a first position under the article or group of articles to be transferred to a second position beneath the article or group of articles, in contact with and supporting the article or group of articles.

2. The transfer apparatus of claim 1 further including a first driver to move the conveyor relative to the elongate transfer member and a first controller to control the first driver to cause the conveyor to move in a predetermined fashion.

3. The transfer apparatus of claim 2 further including a second driver to move the carriage relative to the support and a second controller to control the second driver to cause the carriage to move in a predetermined fashion relative to the support.

4. The transfer apparatus of claim 3 wherein the first driver and the second driver are each selected from the group consisting of electrically, hydraulically and pneumatically actuated motors.

5. The transfer apparatus of claim 3 further including chains and pulleys associated with the carriage to translate motive forces from the second driver to the carriage to move the carriage relative to the support.

6. The transfer apparatus of claim 3 wherein the first controller and the second controller are a computer responsive to outputs of a series of micro-switches.

7. The transfer apparatus of claim 1 wherein the carriage further includes an extension selected from the group consisting of a finger extendable from the conveyor and a fork extendable from the conveyor.

8. The transfer apparatus of claim 7 wherein the extension is substantially parallel to the conveyor.

9. The transfer apparatus of claim 1 wherein the elongate transfer member is a beam and the conveyor is a belt conveyor.

10. The transfer apparatus of claim 9 wherein the belt conveyor is an endless belt movable longitudinally along the beam which is engaged in guides located adjacent each end of the beam.

11. The transfer apparatus of claim 9 wherein the elongate transfer member further includes a selectively displaceable upstanding stop member.

12. The transfer apparatus of claim 1 wherein the support is a column and includes a base to be affixed to a foundation and mounting sites for a driver.

13. A transfer system which includes a plurality of the transfer apparatus according to claim 1.

14. The transfer system of claim 13 wherein transfer apparatus are spaced apart to support the article or group of articles.

15. The transfer system of claim 13 wherein at least two of the transfer apparatus are adapted to operate synchronously.

16. The transfer apparatus of claim 9 wherein the belt conveyor is an endless belt movable longitudinally along the beam which is engaged in guides located at each end of the beam.

17. The transfer apparatus of claim 1 wherein the elongate transfer member has opposing ends, and wherein each of the opposing ends of the elongate transfer member includes a pulley which receives the conveyor.

* * * * *